Dec. 26, 1944.　　　E. A. WILKENSON ET AL　　　2,365,923
PRESSURE GAUGE OF THE ANEROID TYPE FOR
PRESSURE MEASURING IN GAS OR LIQUID
Filed May 8, 1942

*Inventors*
ERIK ALVAR WILKENSON
PER TORSTEN FAXÉN

*By*
Glascock Downing & Seebold
*Attorney*

Patented Dec. 26, 1944

2,365,923

UNITED STATES PATENT OFFICE 2,365,923

PRESSURE GAUGE OF THE ANEROID TYPE FOR PRESSURE MEASURING IN GAS OR LIQUID

Erik Alvar Wilkenson and Per Torsten Faxén, Linkoping, Sweden, assignors to Svenska Aeroplan Aktiebolaget, Linkoping, Sweden Application May 8, 1942, Serial No. 442,276
In Sweden February 7, 1941

5 Claims. (Cl. 73—386)

The present invention relates to pressure gauges of the aneroid type for pressure measuring in gas or liquid in which the pressure to be measured exercises a turning moment on a measuring shaft. This device is characterized by pressure sensitive membranes connected to a measuring shaft by means of steel bands or the like for transmitting a turning moment to the measuring shaft. The pressure sensitive membranes, of which there are at least two in number are of such size relatively to one another and so arranged around the measuring shaft that the radial resultant force of the forces transmitted to the measuring shaft by the steel bands or the like is nil or almost nil over the whole measuring range of the pressure gauge, the turning moment transmitted to the measuring shaft by the bands being counteracted by a turning moment of opposite direction.

Such an arrangement of these pressure gauges among other things involves the advantage that the mounting of the measuring shaft is simplified, said shaft being actuated by no or very small radial forces. Such an embodiment of the invention according to which the aneroid boxes are arranged substantially symmetrically around the measuring shaft also involves the advantage, especially desired when using the pressure gauge in aircrafts, that measuring faults caused by acceleration forces fall away owing to the symmetry. Since the aneroid boxes are arranged in pairs on either side of the measuring shaft the fastening of the steel bands or the like in the measuring shaft is simplified, only one such band being required for each aneroid pair, said band being drawn from one box to the other through an aperture or the like in the measuring shaft. The steel band is preferably so arranged that it passes the measuring shaft in an S-shaped coil.

Figure 1:
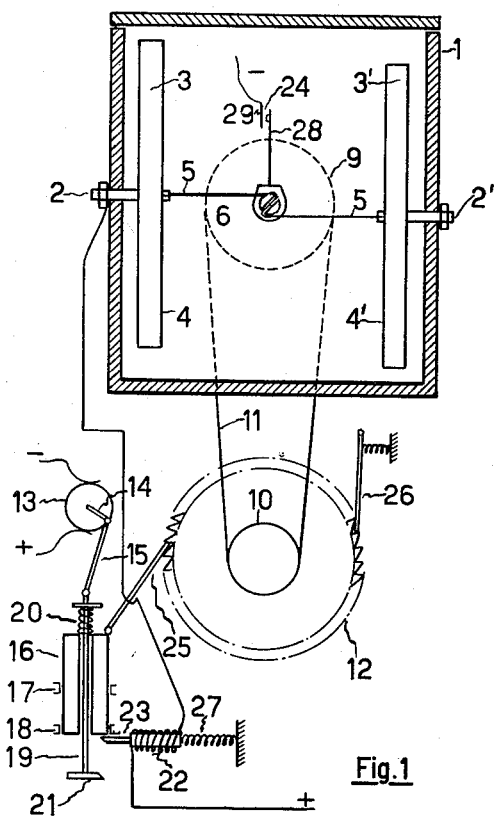
Figure 2:
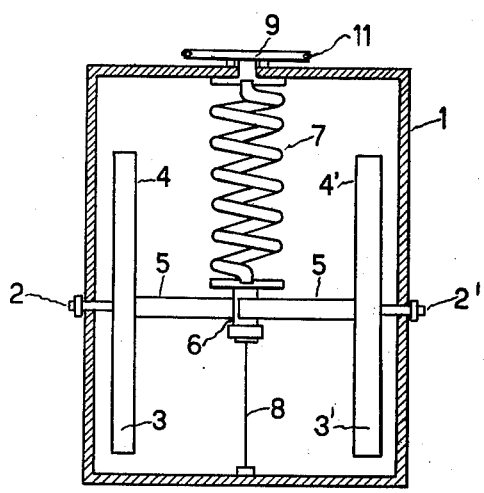

The invention will be described hereinafter more in detail with reference to the accompanying drawing, wherein Fig. 1 shows a plan view of a pressure gauge according to the invention with two aneroid boxes, the measuring shaft being seen in cross section, and Fig. 2 shows a side view of the same pressure gauge.

The pressure gauge shown on the drawing comprises a casing 1, in which two opposite side walls of two aneroid boxes 3 and 3' of equal size are fixed by means of suitable fastening means 2 and 2'. The pressure sensitive membranes 4 and 4', respectively, of the boxes are united in their centres by means of a steel band 5, which passes through an aperture in a measuring shaft 6 in an S-shaped coil. Hereby the band 5 will be wound up on the shaft 6 at the turning of the same without any further means for fixing the band to the shaft being necessary.

The turning moment exercised by the steel band 5 upon the measuring shaft 6 is absorbed by a spring device, which may preferably consist of a cylindrical helical spring 7 provided coaxially with the measuring shaft, one end of said spring being fixed to the measuring shaft and the other end of the same being turnably mounted in the casing 1. (See Fig. 2.)

In order to prevent the helical spring 7 from contracting and, consequently, from lifting the measuring shaft 6 with the band 5 upwardly, and in order to prevent the helical spring at great torsional stress from getting twisted the same is held stretched by means of a thin piano string 8 or the like with small torsional resistance, said string being stretched between the lower end of the measuring shaft and the casing 1 of the pressure gauge.

When the outer pressure increases the membranes 4 and 4' of the aneroid boxes will be pressed more or less inwardly, which movements through the intermediary of the steel band 5 will appear as turning movements of the measuring shaft 6. Thus, the turning position of the measuring shaft will constitute a measure of the pressure prevailing for the moment.

However, the value of the pressure prevailing for the moment indicated by the turning position of the measuring shaft 6 is connected with faults. Thus, there is no direct proportionality between the pressure and the deflection of the membranes 4 and 4' caused by the pressure. Further, for other reasons the membranes are mostly made of a material, usually phosphor-bronze, that absorbs energy when being bent, which will cause a lag of the turning position of the measuring shaft. Further, at changing pressure there arise faults which are caused by the bending stresses in the steel band, when the same is wound up on and off from the measuring shaft, and by changes in the motion transmission between the turning movements of the measuring shaft and the movements of the membranes, said changes being caused by the various number of layers of the steel band wound up on the measuring shaft at various occasions. Therefore, it is a desideratum in pressure gauges of the aneroid type that the reading of the pressure should take place with unchanged or almost unchanged positions of the membranes and of the measuring shaft. This may be accomplished in such a manner that at changing pressure, the load of the helical spring 7 is changed by turning that end of the same which is opposite the measuring shaft 6 so that the measuring shaft will again assume its original turning position. The turning position of said end of the helical spring 7 will then indicate the value of the pressure prevailing for the moment. In such case nothing prevents the helical spring from being made of a material with small energy absorbing capacity such as steel, and therefore, particularly at an automatic returning of the measuring shaft, the lag of the remote end of the helical spring will be of no importance.

In Fig. 1 the device according to the invention is shown completed with a diagrammatically shown servo device according to our copending U. S. A. application "A mechanical relay device," Serial No. 442,275, filed May 8, 1942, by means of which it is possibe at continuous changing of the pressure in the same direction to obtain such an automatic adjustment of the load of the helical spring that the measuring shaft will always be held in its zero position. The upper end of the helical spring 7 is rigidly united with a rope pulley 9, which is coaxial with the spring and which may be rotated by another rope pulley 10 by means of a rope 11 applied around the rope pulleys. The rope pulley 10 is rigidly united with a toothed wheel 12. At changing pressure a crank mechanism driven by an electric motor 13 turns the toothed wheel around its axis. The crank mechanism consists of a crank 14 and a crank rod 15 which move a piston device up and down. This piston device consists of an outer element 16, which is slidably mounted between a pair of guides 17 and 18 or the like, and of an inner element 19, which in its turn is slidably mounted in the outer element. The lower end of the crank rod 15 is mounted in the upper end of the inner element 19 of the piston device. A compression spring 20 strives to force the outer element 16 against a cross piece 21 provided on the lower end of the inner element 19; in the rest position, however, this is prevented by a locking bolt 23 actuatable by an electromagnet 22, said locking bolt in this position being forced by a spring 27 to engage the lower portion of the outer element 16.

This servo device for automatically zeroizing the measuring shaft 6 operates in the following manner:

When the pressure and the load of the helical spring 7 simultaneously have such values that the measuring shaft assumes zero position a contact device 24 provided on the measuring shaft and connected in a circuit including the electromagnet 22 keeps this circuit broken. In this case the spring 27 holds the locking bolt 23 in its locking position and prevents the outer element 16 of the piston device from participating in the movements of the piston device. The electromotor 13, which is preferably constanty running, forces the inner element 19 of the piston device up and down, the spring 20 being alternately compressed and slackened. At such a change of the pressure as causes the measuring shaft 6 to turn somewhat counter-clockwise, as may occur when using the pressure gauge onboard an aircraft when the same dives, the contact device 24 closes the circuit including the electromagnet 22. The latter now withdraws the locking bolt 23 so that the spring 20 is allowed to force the outer element 16 of the piston device downwards towards the cross piece 21 of the inner element 19, whereupon the outer element will participate in the up and down movements of the inner element. To the outer element there is connected an arm 25, which at the upward movements of the outer element engages a tooth of the toothed wheel 12 and turns this wheel through a certain angle. This turning movement is transmitted by the rope 11 to the rope pulley 9 so that the helical spring 7 is somewhat loaded. At the subsequent downward movements of the outer element 16 the toothed wheel 12 is prevented from returning by a locking tooth 26, the arm 25 now gliding on the points of the teeth. When the helical spring 7 has been loaded to such extent that the measuring shaft has been returned to its initial zero position the circuit is again broken by the contact device 24, the locking bolt 23 being forced by the spring 27 towards its locking position. The motor 13, the circuit of which is still closed, of course continues rotating, thus driving the piston device up and down. Next time the outer element 16 of the piston device reaches its upper position the locking bolt 23, therefore, will snap in beneath said element and lock the same, whereafter only the inner element will participate in the up and down motion while alternately compressing and slackening the spring 20.

Since the electromagnet 22 should preferably be so dimensioned that it is capable of removing the locking bolt 23 from the locking position only when the piston device assumes its upper position, and, thus, activity is required of the magnet only in this position, one may, in order to reduce the stresses on the contact device 24 owing to the sparking, connect the contact device in series with a laminated contact rotating with the motor, said contact keeping the circuit broken except when the piston device assumes its upper position. When the contact device 24 is closed the current, therefore, through the electromagnet 22 will be closed only when the piston device assumes its upper position. In the other positions of the piston device the locking bolt 23 will be forced by the spring 27 against the outer element 16 of the piston device and glide along the same, the operation of the device, however, being not disturbed thereby.

In order to spare current the motor 13 may be connected in the same circuit as the contact device 24 and the electromagnet 22, in which case, however, the stress on the contact device will be greater, the latter now also required for closing and breaking the motor current.

The contact device 24 may preferably consist of a contact arm 28 extending from the measuring shaft 6 in such position that in the zero position of the measuring shaft said arm extends about perpendicularly from the steel band 5, in which position it cooperates with a stationary countercontact 29. By this arrangement of the contact arm 28 such unintended closings of the contact device are almost avoided as are caused by the radial vibrations of the measuring shaft, which vibrations, as a matter of fact, substantially occur and have their greatest amplitude in the direction perpendicularly to the steel band 5. In the embodiment of the contact device 24 now described the contact arm 28, at occurring vibrations, will be displaced substantially parallel to itself, an approaching or a removing of the contact arm 28 relatively to the countercontact arm 29 scarcely taking place in such case.

The pressure gauge according to the present invention is particularly suitable in aircrafts as height finder and speed indicator. When using the same as height finder the aneroid boxes are evacuated to a suitable extent. When using the device as speed indicator the interior of the aneroid boxes is given the static air pressure in known manner, while this pressure with the dynamic pressure added thereto actuates the boxes from outside.

The present invention is not limited to the embodiment now described but other embodiments are possible within the scope of the invention. Thus, the aneroid boxes may be more than two and, further, of various sizes, provided only that the aneroid boxes are so arranged around the measuring shaft that the radial resultant force of the forces transmitted to the measuring shaft by the steel bands or the like is nil or almost nil. Since the pressure gauge in most cases is intended for use within a limited measuring range not containing the pressure zero, it may be suitable to make the helical spring 7 double, one of the springs being given a suitable constant pre-load, while the load of the other spring is made adjustable. The required variation of the spring load is then obtained by varying the load of the last mentioned spring.

Having now described our invention, what we claim as new and desire to secure by Letters Patent is:

1. A device of the character described comprising a rotatable shaft, at least two aneroid capsules disposed around said shaft, at least one flexible member connecting said capsules with the shaft for applying rotation to the shaft when the capsules are compressed, said capsules being so disposed around the shaft that turning forces applied to said shaft oppose lateral displacement of said shaft, at least one coil spring co-axial to the shaft having one end connected to one end of the shaft and the opposite end mounted for rotation or adjustment applying a turning force to said shaft in opposition to the turning force applied by said capsules.

2. A device as claimed in claim 1 wherein said aneroid capsules are symmetrically arranged with respect to said rotatable shaft, said shaft being provided with an aperture and said flexible member extending through said aperture to form an S-shaped coil.

3. A device as claimed in claim 1 wherein said spring is of helical form and is attached to a member for subjecting said spring to tensile load.

4. A device as claimed in claim 1 characterized by the provision of a servo-motor, means connecting said servo-motor with the rotatable adjustable end of said spring, and means controlled by the shaft for rendering said servo-motor effective to tension said spring and restore said shaft to initial position following displacement in one direction.

5. A device as claimed in claim 1 characterized by the provision of a contact member movable with said shaft, and means connected to the adjustable end of the spring and controlled by said contact member upon rotary movement of said shaft in one direction to tension said spring and restore said shaft to initial position.

ERIK ALVAR WILKENSON.
PER TORSTEN FAXÉN.